(12) United States Patent
Sullivan et al.

(10) Patent No.: US 7,848,564 B2
(45) Date of Patent: Dec. 7, 2010

(54) THREE-DIMENSIONAL MOTION CAPTURE

(75) Inventors: Steve Sullivan, San Francisco, CA (US); Colin Davidson, Landford (GB); Michael Sanders, San Francisco, CA (US); Kevin Wooley, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 916 days.

(21) Appl. No.: 11/384,211

(22) Filed: Mar. 16, 2006

(65) Prior Publication Data

US 2006/0228101 A1 Oct. 12, 2006

Related U.S. Application Data

(60) Provisional application No. 60/662,973, filed on Mar. 16, 2005.

(51) Int. Cl.
G06K 9/00 (2006.01)
H04N 5/225 (2006.01)
(52) U.S. Cl. ...................................... 382/154; 348/169
(58) Field of Classification Search ........................ None
See application file for complete search history.

(56) References Cited

U.S. PATENT DOCUMENTS

| 5,790,124 | A | 8/1998 | Fischer et al. |
|---|---|---|---|
| 5,831,260 | A | 11/1998 | Hansen |
| 5,932,417 | A | 8/1999 | Birnbaumer et al. |
| 6,072,496 | A * | 6/2000 | Guenter et al. .............. 345/419 |
| 6,166,811 | A | 12/2000 | Long et al. |
| 6,208,348 | B1 | 3/2001 | Kaye |
| 6,324,296 | B1 | 11/2001 | McSheery et al. |
| 6,353,422 | B1 | 3/2002 | Perlman |
| 6,438,255 | B1 | 8/2002 | Lesniak |

(Continued)

FOREIGN PATENT DOCUMENTS

JP 09-084691 9/1998

(Continued)

OTHER PUBLICATIONS

Markoff, "Camera System Creates Sophisticated 3-D Effects" [online], *New York Times*, Jul. 31, 2006, [retrieved on Jul. 31, 2006]. Retrieved from the Internet: <URL: www.nytimes.com/2006/0731/technology/31motion.html>, 4 pages.

(Continued)

*Primary Examiner*—Samir A. Ahmed
*Assistant Examiner*—Fred Hu
(74) *Attorney, Agent, or Firm*—Fish & Richardson P.C.

(57) ABSTRACT

In one general aspect, a method is described. The method includes generating a positional relationship between one or more support structures having at least one motion capture mark and at least one virtual structure corresponding to geometry of an object to be tracked and positioning the support structures on the object to be tracked. The support structures has sufficient rigidity that, if there are multiple marks, the marks on each support structure maintain substantially fixed distances from each other in response to movement by the object. The method also includes determining an effective quantity of ray traces between one or more camera views and one or more marks on the support structures, and estimating an orientation of the virtual structure by aligning the determined effective quantity of ray traces with a known configuration of marks on the support structures.

20 Claims, 5 Drawing Sheets

U.S. PATENT DOCUMENTS

| | | | |
|---|---|---|---|
| 6,515,659 | B1 | 2/2003 | Kaye et al. |
| 6,522,332 | B1 | 2/2003 | Lanciault et al. |
| 6,614,407 | B2 | 9/2003 | Perlman |
| 6,686,926 | B1 | 2/2004 | Kaye |
| 6,977,630 | B1 | 12/2005 | Donath et al. |
| 7,102,633 | B2 | 9/2006 | Kaye et al. |
| 7,116,323 | B2 | 10/2006 | Kaye et al. |
| 7,116,324 | B2 | 10/2006 | Kaye et al. |
| 7,164,718 | B2 | 1/2007 | Maziere et al. |
| 7,212,656 | B2 | 5/2007 | Liu et al. |
| 2001/0033675 | A1 | 10/2001 | Maurer et al. |
| 2002/0041285 | A1 | 4/2002 | Hunter et al. |
| 2002/0060649 | A1 | 5/2002 | Perlman |
| 2004/0063481 | A1* | 4/2004 | Wang ............................ 463/8 |
| 2004/0119716 | A1 | 6/2004 | Park et al. |
| 2004/0155962 | A1* | 8/2004 | Marks ........................ 348/169 |
| 2004/0179008 | A1 | 9/2004 | Gordon et al. |
| 2005/0078124 | A1 | 4/2005 | Liu et al. |
| 2005/0099414 | A1 | 5/2005 | Kaye et al. |
| 2005/0104878 | A1 | 5/2005 | Kay et al. |
| 2005/0104879 | A1 | 5/2005 | Kay et al. |
| 2005/0146521 | A1 | 7/2005 | Kaye et al. |
| 2005/0231505 | A1 | 10/2005 | Kaye et al. |
| 2006/0055699 | A1 | 3/2006 | Perlman et al. |
| 2006/0055706 | A1 | 3/2006 | Perlman et al. |
| 2006/0067573 | A1 | 3/2006 | Parr et al. |
| 2006/0126928 | A1 | 6/2006 | Edwards et al. |
| 2006/0157640 | A1 | 7/2006 | Perlman et al. |
| 2006/0192785 | A1 | 8/2006 | Marschner et al. |
| 2006/0192854 | A1 | 8/2006 | Perlman et al. |
| 2007/0052711 | A1 | 3/2007 | Gordon et al. |
| 2007/0091178 | A1 | 4/2007 | Cotter et al. |
| 2007/0133841 | A1* | 6/2007 | Zhang et al. ................ 382/103 |
| 2008/0180448 | A1 | 7/2008 | Anguelov et al. |
| 2009/0209343 | A1 | 8/2009 | Foxlin et al. |

OTHER PUBLICATIONS

Lin et al., "Extracting 3D Facial Animation Parameters from Multiview Video Clips," *IEEE Computer Graphics and Applications*, 2002, 22(6):72-80.

Grung and Manne, "Missing values in principal component analysis," *Chimometrics and Intelligent Laboratory Systems*, 1998, 42:125-139.

Heap and Hogg, "Towards 3D Hand Tracking using a Deformable Model," *Proceedings of the Second International Conference on Automatic Face and Gesture Recognition*, 1996, pp. 140-145.

Herda et al., "Skeleton-Based Motion Capture for Robust Reconstruction of Human Motion," *Computer Animation 2000 Proceedings*, 2000, pp. 77-83.

Debevec, et al. "Acquiring the Reflectance Field of a Human Face", SIGGRAPH 2000 Conference Proceedings, pp. 1-12, 2000.

International Search Report and Written Opinion for PCT Application No. PCT/US2006/009787, dated Oct. 29, 2007, 12 pages.

International Preliminary Report on Patentability for PCT Application No. PCT/US2006/009787, dated Nov. 13, 2007, 9 pages.

Horparasert et al., "Real-time 3D Motion Capture," Second workshop on Perceptual Interfaces, San Francisco, Nov. 1998, 4 pages.

Furukawa et al., "Dense 3D Motion Capture from Synchronized Video Streams," [online], [retrieved on Aug. 26, 2009]. Retrieved from the Internet <URL: http://www.cs.washington.edu/homes/furukawa/papers/cvpr08b.pdf>, 8 pages.

Wren et al, "Dynamic Models of Human Motion," [online], 1998, [retrieved on Aug. 26, 2009]. Retrieved from the Internet <URL: http://www.drwren.com/chris/dyna/TR-415.pdf>, 6 pages.

Examination Report from European Patent Office for Application No. GB0718003.7, dated Aug. 3, 2009, 2 pages.

Examination Report from New Zealand Patent Office for Application No. 561570, dated Jul. 7, 2009, 2 pages.

U.S. Appl. No. 11/943,556, filed Nov. 20, 2007, Sullivan et al.

U.S. Appl. No. 12/506,798, filed Jul. 21, 2009, Sullivan et al.

U.S. Appl. No. 12/558,806, filed Sep. 14 2009, Sullivan et al.

Chang et al., "Automatic 3D Facial Expression in Analysis in Videos," Proc. IEEE Int'l Workshop Analysis and Modeling of Faces and Gestures (AMFG '05), vol. 3723, pp. 293-307, 2005.

Deng et al., "Animating blendshape faces by cross-mapping motion capture data," In Proceedings of the 2006 Symposium on Interactive 3D Graphics and Games (Redwood City, California, Mar. 14-17, 2006). I3D '06. ACM, New York, NY, 7 pages.

Examination Report from New Zealand Patent Office for Application No. 561570, dated Dec. 18, 2009, 1 page.

Examination Report from New Zealand Patent Office for Application No. 582356, dated Jan. 7, 2010, 2 pages.

Search Report from United Kingdom Intellectual Property Office for application No. GB0922650.7, dated Apr. 20, 2010, 2 pages.

Examination Report from New Zealand Patent Office for Application No. 581496, dated Dec. 2, 2009, 2 pages.

* cited by examiner

THREE-DIMENSIONAL MOTION CAPTURE

This application claims benefit from Provisional Application No. 60/662,973 filed on Mar. 16, 2005 "Apparatus and Method of Capturing the Motion of Humans, Creatures, or Objects," and incorporated herein by reference.

TECHNICAL FIELD

This document relates to a motion capture system and method.

BACKGROUND

Motion capture is an approach to generating motion data that is based on tracking and recording the movement of real objects. One common application of motion capture is in animation where a realistic sequence of motion, e.g., by a human actor, can be captured and used to represent the motion of an animated object.

In some motion capture systems, an actor wears a black body suit. A number of white balls are attached to the suit at the actor's joints, e.g., shoulder, elbow, wrist. The actor then performs a sequence of movements which is digitally recorded by a number of cameras. The recorded data is then processed by a motion capture program.

The motion capture program recognizes the white balls as points. If multiple cameras record the same point in a frame and the locations of the cameras are known, the motion capture program can determine the 3D position of the point using triangulation. The motion capture system may determine 3D positions for all of the points in each of the frames. As used herein, the term "frame" refers to a period of time, or a collection of different periods of time, at which a 3D position of an object being captured is calculated.

The 3D points may be input into a fitting program that fits a virtual skeleton, which represents the bone structure of the object being captured by the system, to the 3D points. For example, an upper arm bone can be defined to exist between a point associated with a shoulder and a point associated with the elbow. The motion capture program may track the movement of the points from frame to frame, which, once fitted to the virtual skeleton, defines the movement of the skeleton from frame to frame.

In some systems, however, use of triangulation may require a relatively large number of cameras to capture each of the differently positioned points from multiple camera angles. Although only two cameras may be required to triangulate a single point, the two cameras typically need to track the point during each frame. As a result, if only two cameras are used, the cameras can lose track of a white ball as a result of the actor turning around. Thus, when an actor performs a scene with lots of motion, a large number of cameras, e.g., 20, are typically utilized to ensure that at least two cameras can track each white ball during each frame.

In some motion capture systems, it may be difficult to determine which white ball recorded with a first camera at a first angle corresponds with the same white ball taken from a second camera at a second angle. When the white balls recorded by two cameras are not correctly associated, the fitting program may produce some artifacts in the form of physically impossible motions in an attempt to fit the skeleton to the 3D points. For example, a leg can suddenly appear to move 180° from one frame to the next frame. While dramatic changes can be easy to spot, subtle mistakes may be difficult to catch.

Additionally, some motion capture systems tend to require refined lighting conditions. For example, the white balls can be formed as objects that reflect infrared (IR) light, and the cameras may be tuned to respond to IR light. When an IR light source is directed toward the white balls, the cameras pick up the points of IR light reflected back from the actor. This approach, however, may not work well on a traditional movie set because when the lights are turned up on a movie set they become quite hot and unintentionally flood the scene with IR light. As a result, the cameras may not be able to distinguish a point of reflected IR light from background noise.

SUMMARY

The present document relates to a system and method for 3D motion capture.

In one general aspect, a method is described. The method includes generating a positional relationship between one or more support structures having at least one motion capture mark and at least one virtual structure corresponding to geometry of an object to be tracked and positioning the support structures on the object to be tracked. The support structures has sufficient rigidity that, if there are multiple marks, the marks on each support structure maintain substantially fixed distances from each other in response to movement by the object. The method also includes determining an effective quantity of ray traces between one or more camera views and one or more marks on the support structures, and estimating an orientation of the virtual structure by aligning the determined effective quantity of ray traces with a known configuration of marks on the support structures.

In second general aspect, a system is described. The system includes an interface to receive recordings from one or more cameras. The recordings include image data of one or more marks on one or more rigid or semi-rigid support structures positioned on an object. The support structures have a substantially fixed position relative to virtual structures generated for the object. The system also includes a ray tracer to generate an effective quantity of ray traces between one or more camera views from the cameras and the marks, and an orientation estimator to estimate orientations of the virtual structures by aligning the effective quantity of ray traces with a known configuration of marks on the support structures.

In another general aspect, an apparatus is described. The apparatus includes a support structure configured to be affixed to an actor whose motion is to be tracked using one or more motion capture cameras, the support structure having a plurality of motion capture marks and sufficient rigidity that, in response to movement by the actor, the marks on the support structure maintain substantially fixed distances from each other.

In yet another general aspect, a motion capture system is described. The motion capture system includes at least one support structure configured to be affixed to an actor whose motion is to be tracked, the support structure having a plurality of motion capture marks and sufficient rigidity that, in response to movement by the actor, the marks on the support structure maintain substantially fixed distances from each other, a motion model comprising one or more virtual structures representing geometry of the actor to be tracked, and a computer system. The computer system is capable of executing a plurality of substantially simultaneous processes, including one or more processes to perform the following: (a) generate a positional relationship between the at least one support structure and the one or more virtual structures representing geometry of the actor; (b) determine an effective quantity of ray traces between one or more camera views and one or more marks on the support structures; and (c) estimate orientations of the virtual structures by aligning the effective quantity of ray traces with a known configuration of marks on the support structures.

The systems and techniques described here may provide one or more of the following advantages. First, accurate motion capture may be accomplished using a decreased number of cameras, which may reduce the cost and complexity of the system. Second, an object's motion may be captured in a variety of lighting conditions, which may include substantially complete darkness. Third, a three dimensional position of a mark on an object may be calculated even though the mark is only captured by one camera or is not captured at all. Fourth, a system may include an object model that facilitates prediction of motion based on a unique object's typical range of motion and physical structure.

The details of one or more embodiments are set forth in the accompanying drawings and the description below. Other features and advantages of the described embodiments will be apparent from the description and drawings, and from the claims.

DESCRIPTION OF DRAWINGS

Like reference symbols in the various drawings indicate like elements.

DETAILED DESCRIPTION

Figure 1:
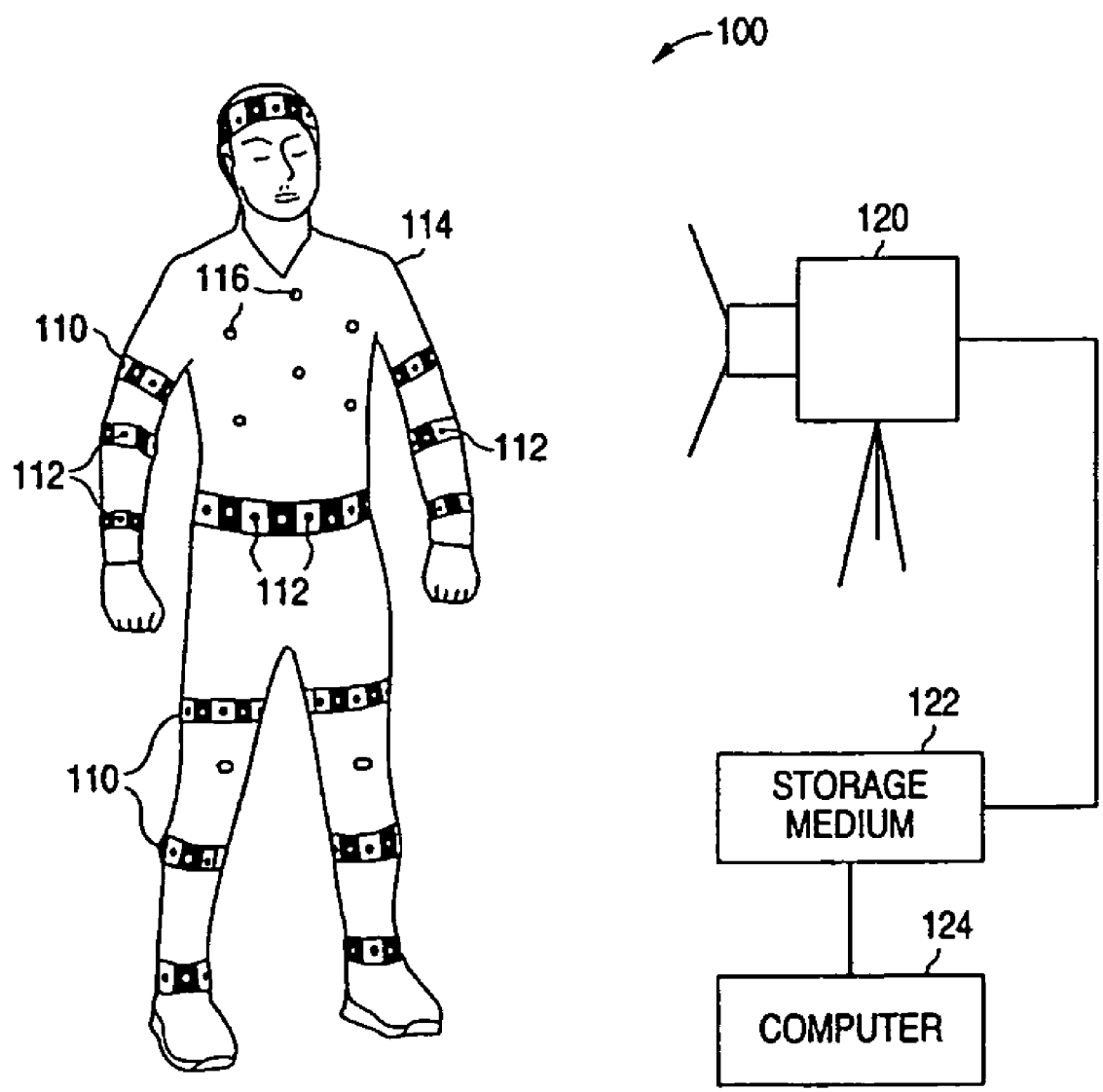
FIG. 1 is a diagram illustrating an example of a motion capture system.

In a system 100 of FIG. 1, a number of marks, which may be detected by one or more camera(s), are placed on rigid or semi-rigid support structures. The support structures, in turn, are attached to an underlying object, such as an actor 114 or a body suit of the actor. As used herein, a rigid structure is one in which the movement of the marks on a same support structure is negligible relative to the marks' positions from each other. Additionally, a semi-rigid structure is one in which the movement of the marks on a same support structure is permitted, but the movement is substantially limited within a predetermined range. The amount of the movement between the marks may be based on several factors, such as the type of material used in the support structure and the amount of force applied to the support structure. For example, a flexible body suit, depending on materials used and methods of construction, may qualify as a "rigid" or "semi-rigid" support structure in the context of the disclosed techniques provided that it demonstrates the appropriate level of rigidity. Additionally, bands attached to a body suit may also qualify as the rigid or semi-rigid support structure.

In some embodiments, the mark-to-mark spacing on a support structure may determinable in techniques discussed in more detail below, and thus the spacing does not need to be known a-priori. The system can use one or more cameras to track different marks on the support structures. These marks may be used to estimate the motion (e.g., position and orientation in 3d space through time) of the support structures. The knowledge that each support structure is rigid (or semi-rigid) may be used in the estimation process discussed below and may facilitate reconstruction of the motion from a single camera.

In some embodiments, the marks can made of high-contrast materials, and may also optionally be lit with light emitting diodes (LEDs) or luminescent materials that are visible in the dark. These lighting qualities can enable cameras to capture the marks on the object in low lighting or substantially dark conditions. For example, an actor being filmed may walk from a well lit area to a shadowed area. The marks may be captured despite the actor's movement into the shadowed area because the marks glow or emit light.

In operation, one or more video cameras can record a motion sequence, and store the images to a storage device, such as a tape or disk, for processing. Also, the images may be directly transmitted to a processing device for processing in real-time or near real-time.

An operator or algorithm computes the location of the camera and its visual properties, such as the camera's field of view, lens distortion, and orientation, while the sequence was being recorded. For example, an algorithm can derive the position of the camera given enough marks and information associated with the marks, such as the number, identification, and position of the marks captured by that camera.

Figure 2:
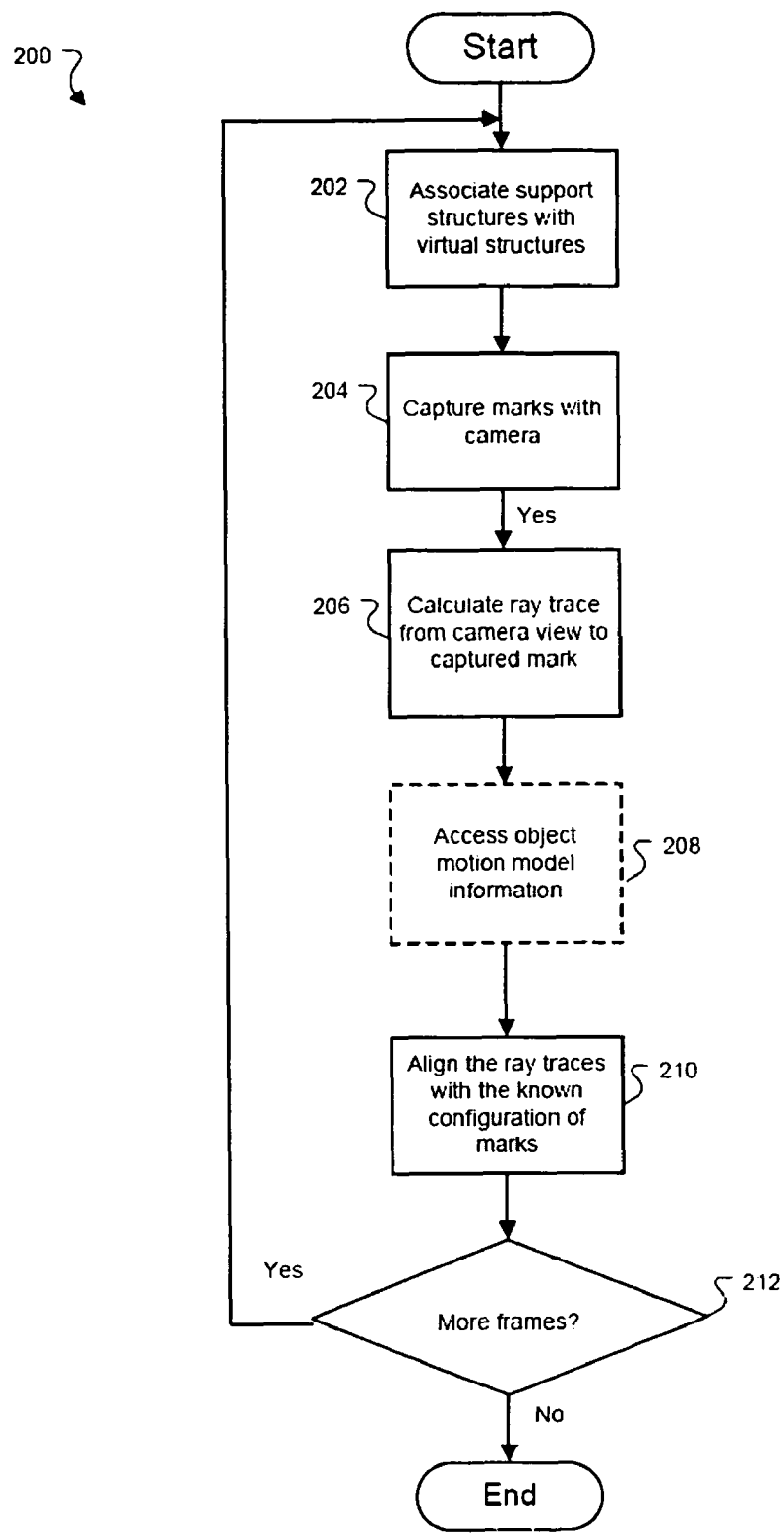
FIG. 2 is a flow chart illustrating an example of a method for processing frames of motion capture data.

FIG. 2 shows a flow chart that illustrates an example of a method 200 for processing frames of motion capture data to compute a relationship of the marks on a structure to the underlying object being tracked. In the embodiment shown in FIG. 2, each of the support structures is associated with a virtual structure, such as a virtual bone structure generated to model a skeleton of the object, in step 202. For example, the support structure may be a band that surrounds an actor's arm. The band can be ring shaped and occupies a 3D space defined by X, Y, and Z axes. The point in the object space of the ring where the values on the X, Y, and Z axes meet (e.g., X=Y=Z=0) is the geometric center of the band. In some embodiments, this geometric center may be substantially aligned with a geometric center of a virtual arm bone. In other embodiments, the geometric center of the virtual arm bone may be offset relative to the geometric center of the ring.

The cameras capture, or record, marks located on the support structures and the recordings are used to identify locations where the marks appear, as shown in step 204. An algorithm may calculate one or more ray traces extending from one or more cameras through one or more of the recorded marks, as shown in step 206. For example, algorithm may calculate two ray traces. Both ray traces may extend from a single camera view to a first recorded mark and a second recorded mark, respectively.

Information about the support structure, such the distance between the marks on the structure, the rigidity of the structure, and the geometry of the structure may be generated by the system (discussed in greater detail below) or input by a user. This information may define a configuration describing where the marks on a structure should or could occur. For illustrative purposes the configuration information is described herein as a virtual support structure in 3D space.

An algorithm can estimate the current 3D orientation of the virtual bone structures by aligning the virtual support structure with the 3D ray traces, as shown in step 210. This alignment may be implemented using several different types of solving algorithms, such as a maximum likelihood estimation or a Levenberg-Marquardt nonlinear minimization of a heuristic error function. The algorithm's solution will move the 3D position of the marks on the virtual support structures to lie on the 3D ray traces. After alignment, the current orientation of the virtual bone structures is known because the virtual support structure has a substantially fixed relationship to the orientation of its corresponding virtual bone structure.

In some embodiments, two or more cameras may record multiple observations of the same mark. The alignment algorithm may use every additional recording of a mark's position as an additional constraint in the solving calculation. If no marks on a support structure are captured by a camera, observations of marks on other support structures can be used to estimate the position of the uncaptured support structure, or at least constrain it to an area of space. For example, a support structure around and actor's elbow may not be visible, however, a support structure around the actor's wrist may be visible. The position of a virtual wrist bone corresponding to the wrist support structure may be calculated in the manner described above. Because the position of the virtual wrist bone is known, the possible locations of a virtual elbow bone corresponding to the elbow support structure are constrained to a limited area. This constraint may be based on an object motion model, which can substantially define the physical structure of the actor including a length of the actor's bone that connects the elbow to the wrist. The object motion model is discussed in more detail below.

Given these estimates or bounds for the 3D positions of the virtual bone structure, the motion of the underlying object can be estimated. In cases where the a position of a marks cannot be used to estimate the motion (e.g. some parts are not observed by any camera), one or more physical properties of the object, such as the natural limits of the range of motion for an actor's leg, can be used to infer the most likely position of the mark (and thus the motion of the object) based on current observation of virtual bone structures with known 3D positions and estimates derived from the placement of virtual bone structures at prior and future periods in time.

Optionally, an object motion model may be accessed, as shown in step 208, to further constrain the algorithm used to solve for the alignment of the ray traces with a known configuration of the marks. An object motion model can substantially define the motion of the underlying object. The mass and articulation properties of an object, the range of motion, velocity, and accelerations of a particular human's physique can be derived based on previously captured motion information for the object. For example, several cameras and a traditional motion capture device may capture an actor's bone lengths and typical range of movement by recording the actor's motions and triangulating the position of white balls placed on the actor. The captured motion may be then be used to derive a model specific to that actor.

After one frame of captured image data is processed, the method 200 can determine whether there are more frames of data to process, as shown in step 212. If there are more frames, the method can return to step 202. Otherwise, the method may end.

FIG. 1 shows a diagram that illustrates an example of a motion capture system 100. As shown in the FIG. 1 example, system 100 includes a number of support structures 110, and a number of marks 112 that are attached to each support structure 110.

In the present example, the support structures 110 are implemented as cylindrical bands that are wrapped around an underlying object, such as an actor 114. In some embodiments, the support structures 110 are rigid and cannot be flexed to a significant extent (e.g., relative to accuracy/precision of the cameras and/or motion capture program). Additionally, the support structures 110 may be semi-rigid and can be flexed in a limited manner.

Further, each of the support structures 110 can have any of a number of colors, such as a series of colors that sharply contrast with each other. In the FIG. 1 example, each of the support structures 110 has a series of alternating black and white square regions.

The marks 112, in turn, are attached to a support structure 110 so that a pair of adjacent marks 112 may be separated by a fixed or semi-fixed distance from each other when measured along an axis of the support structure 110 that passes through the marks. Each pair of adjacent marks 112, in turn, can be separated by the same distance. For example, a number of marks 112 can be formed on a support structure 110 so that the marks 112 are evenly spaced apart. In some embodiments, the marks do not need to be evenly spaced apart, but still may have a distance from other marks that does not substantially change.

When a rigid support structure 110 is utilized, the distance between an adjacent pair of marks 112 can be substantially fixed. As a result, the distance remains substantially unchanged when the underlying object 114 moves from one position to another position.

When a semi-rigid support structure 110 is utilized, the distance between an adjacent pair of marks 112 may not be fixed but rather may vary to a limited extent. As a result, the distance can vary within a range when the underlying object 114 moves from one position to another position. For example, the distance between an adjacent pair of marks 112 on a semi-rigid support structure 110 can vary because the structure 110 may flex or twist. In some embodiments, the amount of possible variation due to one or more forces applied to the support structure is measured and input into the system 100 to compensate for possible changes in observed distances between marks. Thus, a semi-rigid support member may restrict the movement of the marks 112 to a limited range of positions depending on variables, such as the material of the support member and the direction and magnitude of a force applied to the member.

In addition, the marks 112 can have any of one or more geometric shapes. For example, the marks 112 can be implemented with circles, triangles, squares, or rectangles. As shown in FIG. 1 example, each mark 112 has the same geometric shape, and is implemented with a dot.

In addition to having one or more shapes, the marks 112 can have any of one or more colors, such as colors that sharply contrast (e.g., a contrast ratio of 400:1) with the colors of the support structure 110. In FIG. 1 example, the marks 112 have a series of alternating contrasting colors (white and black) that are opposite to the series of alternating contrasting colors (black and white) on the support structure 110.

In addition, in some embodiments, the marks 112 can be implemented with a number of contrasting (e.g., black and white) lines. One advantage of using marks 112 with a number of contrasting lines is that the lines can be used to form a bar code which, in turn, can be used to uniquely identify the mark 112. For example, the computer 124 may include an index that correlates observed bar codes with particular marks. When a bar code is captured by a camera, the index may be access to identify which mark is specified by the code (e.g., the identified mark may be a mark placed at the inner side of the left elbow on an elbow support structure).

Further, the marks 112 can be covered with or composed of a luminous material, or can be self-illuminating, such as marks 112 that incorporate light emitting diodes (LEDs). For example, infra-red, self-illuminating marks 112 can be seen when it is substantially totally dark, and, as a result, provide invariance to lighting conditions.

Thus, the luminous or illuminated marks may facilitate performing motion capture of a scene at night or, more commonly, when an actor is walking out of a dark shadow into light; or the actor stands in a dark area among a number of characters, and then steps out into a light area.

The marks 112 can be planar with respect to the support structure 110, can be non-planar (e.g., protrude) with respect to the support structure 110, or a combination thereof. In the FIG. 1 example, each mark 112 is implemented with a dot that lies in the same plane as the support structure 110. Further, individual marks 116 which are unrelated to a support structure 110 can be used.

In addition to the support structures 110 and marks 112, system 100 also includes a one or more cameras 120 that capture images of the motion of the marks 112 as the actor 114 performs a series of movements. Further, system 100 includes a storage medium 122 that is connected to the cameras 120 to digitally record the images captured by the cameras 120.

System 100 also includes a computer 124 that is connected to storage medium 122. As described in greater detail below, computer 124 can execute a motion capture program that tracks the movement of the marks 112 from frame-to-frame to extract the motion of an underlying object, such as an actor.

In operation, one or more cameras 120 are placed around actor 114. Actor 114, in turn, wears a black body suit, while a number of support structures 110 are placed around the body of actor 114 to recover the skeletal motion of actor 114. Additionally, individual marks 116 can be placed directly on the actor's chest and back. (A support structure 110 can alternately—or in addition—be placed around the actor's chest.)

Any number of marks 112 located on the support structure 110, including zero, can be seen by each camera. For example, a support structure 110 can have three marks 112 that are fully visible from each camera view. In another example, only a single mark 112 can be seen in a camera view. In some embodiments, none of the cameras 120 need to see the same marks 112 to reconstruct the motion of the actor's virtual bone structure.

Once system 100 is set up, actor 114 can perform a series of movements. The support structures 110 allow the marks 112 to have a substantially fixed relationship with actor 114 and to each other. In some embodiments, when actor 114 moves, the marks 112 follow the movement substantially as though the marks 112 were rigidly attached to points on actor 114.

The movements of the marks 112 on the support structures 110 are then captured by the cameras 120, and digitally recorded in storage medium 122. The recorded data then may be processed by computer 124 using a motion capture program.

As discussed earlier, FIG. 2 shows a flow chart that illustrates an example of the method 200 for processing frames of motion capture data to derive the orientation of an object's virtual bone structure. Combining the processed frames generates information associated with the tracked movement of the object's bone structure from frame to frame.

Figure 3:
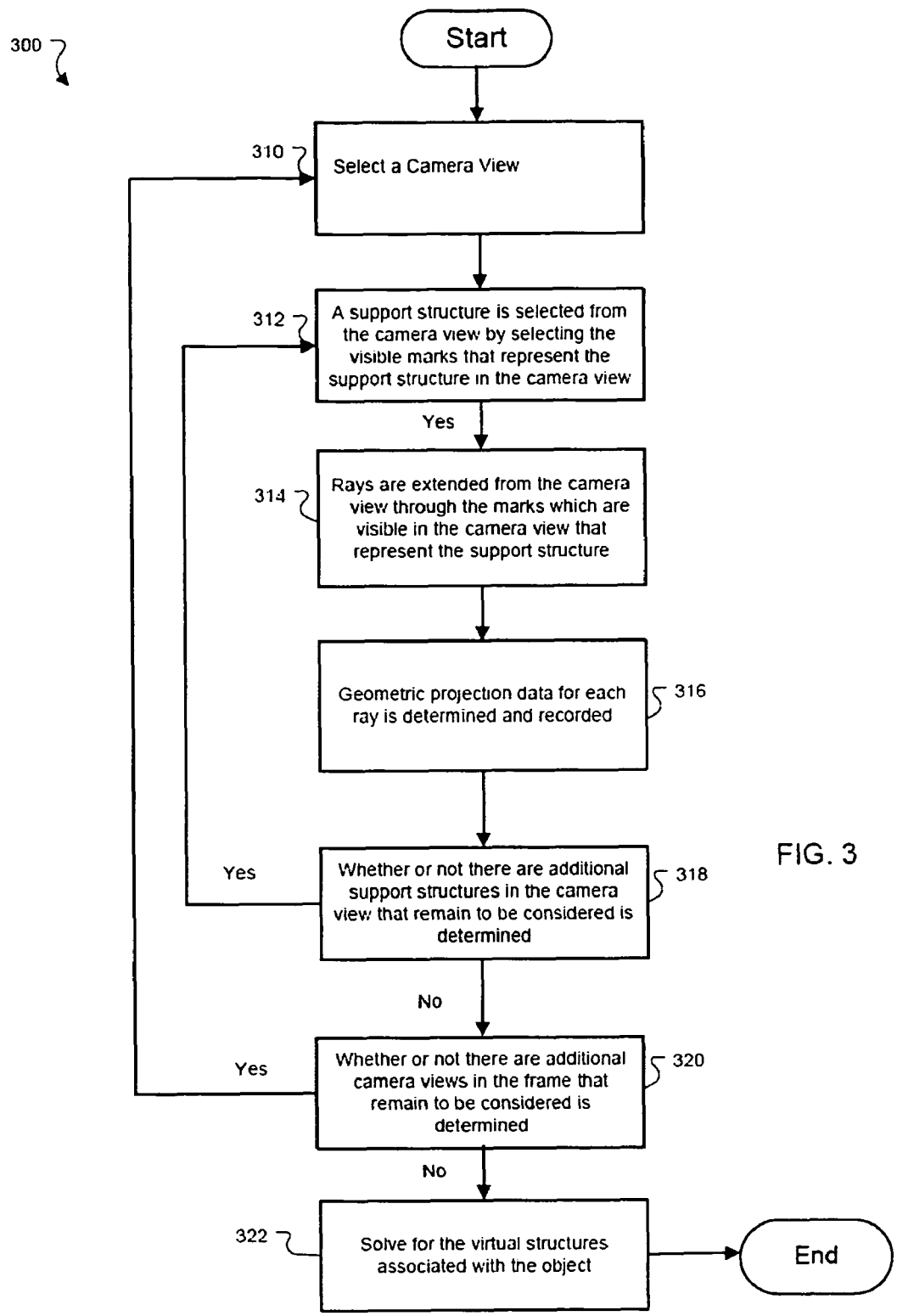
FIG. 3 is a flow chart illustrating an example of a method for calculating a 3D position of each visible mark on each support structure in a frame.

FIG. 3 shows a flow chart that illustrates an example of a method 300 of calculating the position of each virtual structure associated with each support structure in a frame. As shown in FIG. 3, a method 300 begins in 310 where a camera view is selected. The camera view has a 3D position in space which is either known by the motion capture program or determined based the position of marks recorded by the camera and information associated with the marks as discussed above.

Once a camera view has been selected, a support structure is selected from the camera view in 312 by selecting the visible marks that represent the support structure in the camera view. In 314, ray traces are extended from the camera view through the marks which are visible in the camera view.

For example, if two marks on a support structure can be seen in a camera view (which is determined by the camera's properties, such as position, field of view, and orientation), then a first ray is extended from the camera view through the first mark, while a second ray is extended from the camera view through the second mark. Once the rays have been extended, geometric, or perspective, projection data for each ray is determined and recorded in 316.

Following this, method 300 determines in 318 if additional support structures in the camera view remain to be considered. For example, additional support structures may remain if any marks have not been processed yet. If additional support structures remain to be considered, method 300 returns to 312 to select another support structure from the camera view by selecting the visible marks that represent the support structure in the camera view. This process continues until all of the support structures in the camera view have been considered.

When no more support structures in the camera view remain to be considered, method 300 moves to 320 to determine if additional camera views remain to be considered in the frame. If additional camera views remain to be considered, method 300 returns to 310 to select another camera view. This process continues until all of the camera views in the frame have been considered.

When no more camera views in the frame remain to be considered, method 300 moves to 322 to calculate the 3D positions of the virtual bone structure as described in association with FIG. 2. Additionally, in some embodiments, the 3D positions of the bone structure associated with a support structure can be determined using conventional geometric solvers that utilize as inputs the geometric projection data of the rays, the 3D positions of the camera views, the geometry of the support structure, and the fixed spacing relationship that exists between the marks on the support structure.

Returning to FIG. 2, the 3D position of a support structure, and thus a virtual structure, can be calculated from the positions of the visible marks on the support structure.

For example, the 3D position of a rigid support structure can be determined if three rays pass through three different visible marks. In this case, the 3D positions of the three different visible marks can be determined due to the fixed spacing relationship that exists between the marks.

Since the 3D positions of three different marks are known, the 3D position of the support structure is fixed in space and can therefore be calculated. Further, the 3D position of each remaining (non-visible) mark on the support structure can also be determined based on the substantially fixed spacing relationship that exists between the marks.

In some embodiments, the 3D position of a rigid support structure may not be determined if only two rays pass through two different visible marks. In this case, the 3D positions of the two different visible marks can be determined due to the fixed spacing relationship, but the two different visible marks do not allow the position of the support structure to be fixed in space.

However, an estimate of the 3D position of the support structure can be calculated because the 3D positions of the two different marks bound the support structure to lie within a limited range of 3D positions. To increase the accuracy of the estimation, past motion data, which further limits or constrains the 3D position of the support structure, can also be used.

In some embodiments, if one ray passes through a single mark that is associated with a rigid support structure, there may be insufficient data to determine the 3D position of the single mark. However, when utilized with motion models and position data of other support structures, estimates of the 3D position can be made.

In some situations, the 3D position of a semi-rigid support structure cannot be determined if three rays pass through three different visible marks, however, an estimate of the 3D position can be made. In this case, both the fixed spacing relationship that exists between the marks is known, and the stiffness, or rigidity, of the support structure is known. As a result, the maximum amount of flex, compression, and stretch that can occur between adjacent marks is limited and can be modeled.

As before, less information may be available when only two rays pass through two different visible marks on a semi-rigid support structure, or one ray passes through one visible mark a semi-rigid support structure. However, as before, estimates can be made of the 3D location of the support structure in both of these cases.

With respect to the substantially fixed spacing relationship that exists between the marks on the support structure, the spacing relationship can be known a-priori, unknown a-priori, or a combination thereof. If the mark-to-mark spacing is not known ahead of time, the spacing can be estimated during processing using multiple recordings of the marks and information associated with the marks because the mark-to-mark spacing is substantially fixed.

The system 100 can use the above described methods to determine the 3D position of the marks instead of using triangulation, which may depend upon two cameras recording the same mark at the same time. The above described methods may decrease the number of cameras required to determine a 3D position of a mark because the determination may only require one camera to record the mark.

Referring again to FIG. 2, when the virtual structure is a skeleton, method 200 calculates the 3D position of the skeleton in the first frame by calculating the 3D position of each bone in the first frame. The 3D position of a bone in the first frame is calculated using the 3D positions of the support structures associated with the bone, as shown in step 210, along with knowledge of the length and orientation of the bone with respect to the support structures, which may be accessed as shown in optional step 208.

For example, if the 3D position of a rigid support structure formed around an elbow has been calculated, and the 3D position of a rigid support structure formed around a wrist has been calculated, then the 3D position of the bone that lies between the elbow and the wrist can also be calculated using only the orientation of the bone with respect to the elbow and wrist support structures.

In other embodiments, when an estimate of the 3D position of a rigid or semi-rigid support structure formed around an elbow has been calculated, and an estimate of the 3D position of a rigid or semi-rigid support structure formed around a wrist has been calculated, then knowledge of the length and orientation of the bone with respect to the elbow and wrist support structures may allow an estimate of the 3D position of the bone that lies between the elbow and the wrist to be calculated.

Once a 3D position of the virtual structure in the first frame has been calculated, method 200 repeats to calculate a 3D position of the virtual structure in a second frame. To calculate the 3D position of a support structure in the second frame, the 3D positions of the virtual structure can be tracked from the first frame to the second frame. Thus, method 200 can track the movement of the virtual structure from frame to frame which, when associated with a virtual skeleton, can define the movement of the skeleton from frame to frame.

Figure 4:
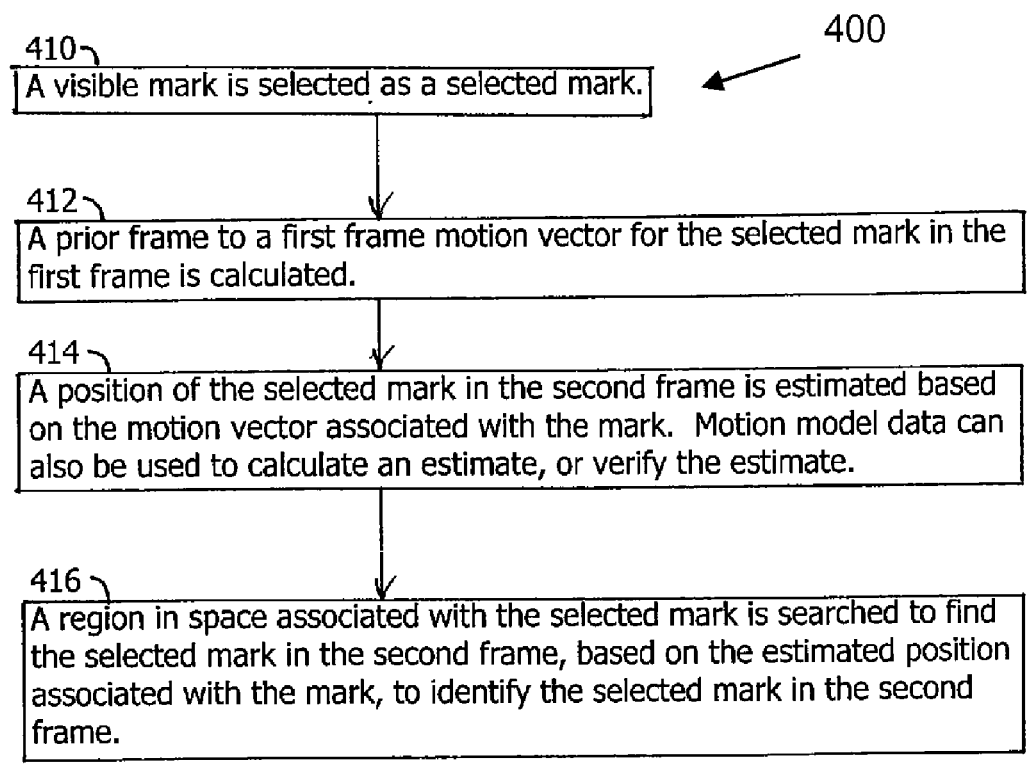
FIG. 4 is a flow chart illustrating an example of a method for tracking each visible mark from a first frame to a second frame.

FIG. 4 shows a flow chart that illustrates an example of a method 400 of tracking each visible mark from a first frame to a second frame. As shown in FIG. 4, method 400 begins in 410 where a visible mark is selected as a selected mark. Next, in 412, a prior frame to a first frame motion vector for the selected mark in the first frame is calculated.

Following this, in 414, a position of the selected mark in the second frame is estimated based on the motion vector associated with the mark. Optionally, method 400 can also use motion model data to calculate an estimate, or verify the estimate. For example, if motion model studies indicate that an arm cannot move any further in a particular direction, then the estimate can be adjusted to ignore contradictory data and/or adjust the solution globally to best fit the known limits.

A motion model can describe how each of the joints of an actor can move correlated with other joints. For example, if the actor is standing in a position and an arm is moving up, chances are the arm in the next frame is going to be in one of a limited number of positions. As a result, a limit can be put on the range of relative movement between joints and/or limbs.

In 416, a region in space associated with the selected mark is searched to find the selected mark in the second frame, based on the estimated position associated with the mark, to identify the selected mark in the second frame. When the position and motion vector of a mark is known, and any motion model limits are known, then the location of the mark in the second frame can be estimated. As a result, the search can be limited to an area where the mark is expected to be located.

In addition, if another actor in the next frame walks in front of the marks on a support structure so that nothing is seen, then the observations can be thrown out. In this case, the position and motion vector of the marks on a support structure, along with motion model data which constrains the movement (e.g., an arm cannot whip from one extreme to another extreme in a single time frame), can be used to generate an estimate of the 3D position of the occluded mark in the next frame.

Method 400 is performed for each visible mark on each support structure in the first frame. Once each visible mark in the first frame has been tracked and identified in the second frame, the 3D position of each support structure can be calculated in the second frame in the same manner as described above.

Once a 3D position of the virtual structure in the second frame has been calculated, the motion capture system may determine if the movement of the virtual structure (e.g., the skeleton) from the first frame to the second frame is unnatural (e.g., does not satisfy the motion model).

If the movement of the underlying structure is natural, then a position of the virtual structure may be calculated for a third frame, and continues on in the manner described above. On the other hand, if the movement of the virtual structure is unnatural, then method the motion model may be used to provide a more reasonable estimate.

For example, assume that after a first pass, the location of a mark is wrong because it is off by one mark such that at the end the skeleton does not fit the motion model very well, or fits well in one region but not in another. In this case, the process is repeated for the region that does not fit the motion model very well.

Further, once a sequence has been reconstructed, the motion model can also be used to clean up errors. By going backward and forward in time, the frames can be viewed as a sequence to verify that the individual accelerations make sense as a sequence. For example, jittering and other less noticeable errors can be addressed.

Referring again to FIG. 1, as noted above, any number of marks 112 can be fully seen in a camera view of a support structure 110. The advantage of seeing more than one mark 112 in a camera view of a support structure 110 is that there is an increased likelihood that the camera will have a clear view of at least one of the marks 112. However, if too many marks 112 can be seen in a camera view (e.g., more than four marks 112 visible in a camera view), then tracking errors may be more difficult to identify.

For example, assume that a camera can see a single mark 112, and the single mark 112 is known to be attached to a leg. When the single mark 112 is tracked from one frame to the next, if the leg mark 112 in a current frame is mistakenly identified in the next frame, the leg will incorrectly turn by almost by 90°, an easy mistake to identify.

On the other hand, if five or six marks 112 can be seen in a view and the leg mark 112 in a current frame is mistakenly identified in the next frame, then rather than being off by nearly 90° as is the case with a single mark 112, a much smaller error is present. As a result, the number of marks 112 that can be seen in a view preferably provides a degree of exposure of each support structure 110 so that a mismatch in the tracking would be easily exposed during reconstruction.

For example, two-to-three marks 112 per camera view of a support structure 110 increases the likelihood of clearly seeing one of the marks 112, along with the property that it is possible to be confused when tracking marks 112 from one frame to the next, but when confusion is present (the wrong mark 112 is a second frame is identified as the corresponding mark 112 from the first frame), the error is quite noticeable and can be easily detected post process.

The support structure 110 placed around the waist may differ from the other support structures in that many more than three marks 112 can be seen from any camera position. The waist, however, is a unique area which is unlikely to be confused with something else. There is only one waist, and the support structure 110 formed around the waist is also a much different size, unlike the arms and legs which are somewhat similar in size.

In some embodiments, only one camera is needed to record images of a person's motion at high speed while the positions of the marks 112 on the support structures 110 in each image are tracked. When less than three marks on a support structure are visible in a frame, the 3D position of the support structure 110 can be estimated, which in turn drives an estimate of where the underlying skeleton must be.

Even when no individual support structure 110 can be estimated precisely, there are usually enough observations to uniquely recover the underlying skeleton to which they are all attached. When the skeleton cannot be uniquely determined, statistics can be used on the person's motion (derived from motion studies) to choose the most likely position for the under constrained portions.

The described embodiments may provide resistance to occlusion with a fraction of the cameras (e.g., 20) required by a conventional motion capture system, which may have two cameras tracking every dot during a frame. The reduction in cameras may reduce the costs of collecting and processing the motion data.

For example, assume that two cameras are used, and a second actor walks in front of a first camera, completely blocking the first camera's view of the first actor. Using the system 100, the 3D position of a support structure 110 can be calculated based on the data captured from the second camera. Further, the system 100 may not need to see every mark 112 all of the time. Using a substantially fixed spacing relationship, when the position of one or more marks 112 is determined, the position of the support structure 110 can be determined or estimated.

The method may use fewer cameras than traditional techniques, and need only use one. Each camera view can add more information about the entire structure. Thus, if a support structure 110 is treated as a unified object, and it can be seen from one view, then an estimate of its position can be made.

In some implementations, the system 100 works under a variety of lighting conditions, which may include complete darkness. In particular, it may allow high-fidelity motion to be captured outdoors or in bright lighting as is typically found on a film set during principal film photography.

Figure 5:
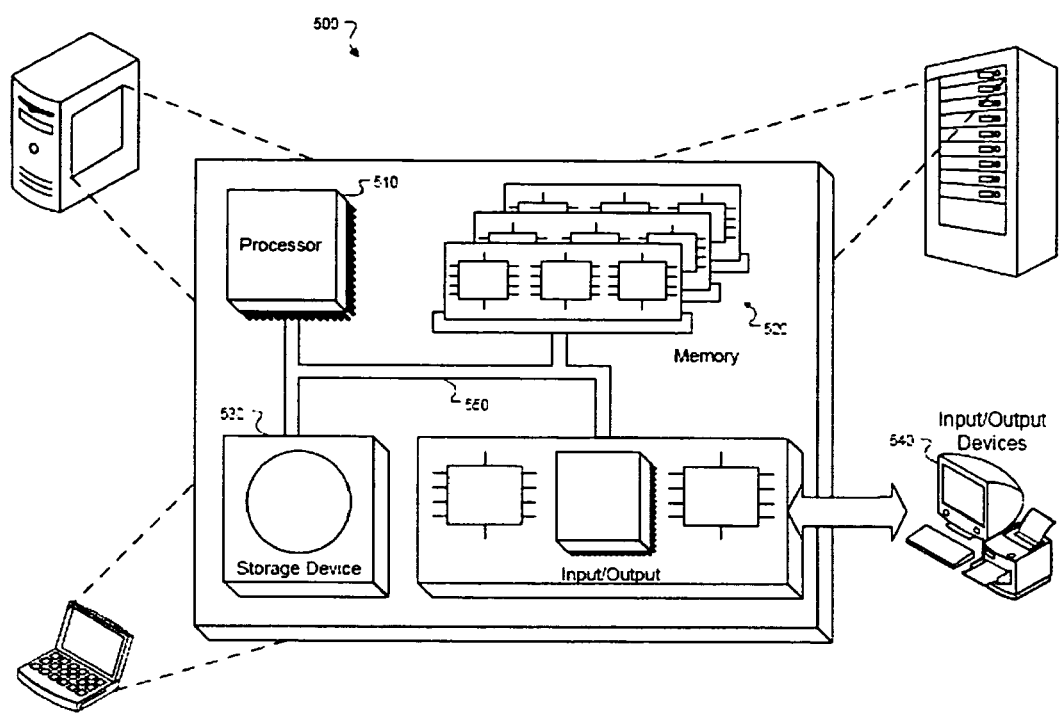
FIG. 5 is a block diagram illustrating an example of a computer.

FIG. 5 is a block diagram of a general computer system 500. The computer system 500 can be used in the operations described above, according to one embodiment. For example, the system 500 may be included in any or all of the computer 122 and the storage medium 122.

The system 500 includes a processor 510, a memory 520, a storage device 530 and an input/output device 540. Each of the components 510, 520, 530 and 540 are interconnected using a system bus 550. The processor 510 is capable of processing instructions for execution within the system 500. In one embodiment, the processor 510 is a single-threaded processor. In another embodiment, the processor 510 is a multi-threaded processor. The processor 510 is capable of processing instructions stored in the memory 520 or on the storage device 530 to display graphical information for a user interface on the input/output device 540.

The memory 520 stores information within the system 500. In one embodiment, the memory 520 is a computer-readable medium. In one embodiment, the memory 520 is a volatile memory unit. In another embodiment, the memory 520 is a non-volatile memory unit.

The storage device 530 is capable of providing mass storage for the system 500. In one embodiment, the storage device 530 is a computer-readable medium. In various different embodiments, the storage device 530 may be a floppy disk device, a hard disk device, an optical disk device, or a tape device.

The input/output device 540 provides input/output operations for the system 500. In one embodiment, the input/output device 540 includes a keyboard and/or pointing device.

Various embodiments can be implemented in digital electronic circuitry, or in computer hardware, firmware, software, or in combinations of them. Apparatus can be implemented in a computer program product tangibly embodied in an information carrier, e.g., in a machine-readable storage device or in a propagated signal, for execution by a programmable processor; and method steps of the various embodiments can be performed by a programmable processor executing a program of instructions to perform functions of the various embodiments by operating on input data and generating output. The embodiments can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, various embodiments can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The various embodiments can be implemented in a computer system that includes a back-end component, such as a data server, or that includes a middleware component, such as an application server, such as the first and second systems 102, 104, or an Internet server, or that includes a front-end component, such as a client computer having the UI 200 or an Internet browser, such as the browser 306, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of the described embodiments. For example, the support structures do not need to be attached over a body suit, but may be directly fitted to an actor or other underlying object. In some embodiments, the marks also can be attached directly to the underlying object, for example, when the underlying object is a body suit worn by the actor.

Also, the methods 200 and 300 are for illustrative purposes. The marks on a particular support structure do not necessarily need to be processed before moving to a different support structure. The marks may be processed in an order which processes marks irrespective of the support structure to which the marks belong. Similarly, marks captured by different cameras may be processed in an order not dependent upon a particular camera view. For example, a first mark from a first camera view may be processed and then a second mark from a second camera view may be processed.

Additionally, the methods illustrated in FIGS. 2-4 may be performed sequentially, in parallel or in an order other than that which is described. It should be appreciated that not all of the techniques described are required to be performed, that additional techniques may be added, and that some of the illustrated techniques may be substituted with other techniques.

Also, in some embodiments, additional processing may occur when the ray traces are aligned with the known configuration of marks. For example, a smoothing process may be used in step 210. The smoothing calculation may calculate a second derivative of the curve of a joint angle. The second derivative may be included in error calculations used to determine the alignment of the marks with the ray traces. If the curve is noisy, the second derivative will be large. If the curve is smooth, the second derivative will be small. The alignment may fit the data using the second derivative to select a position estimate for the virtual structure that results in a smoother curve.

In yet other embodiments, the virtual structures can include geometrical axes. For example, if an object without bones is captured, the virtual structure may consist of axes within the object space occupied by the object.

Additionally, in some embodiments, the object to be captured is not a human actor, but is another animal, such as a dog, a fish, a bird, or snake. Accordingly, other embodiments are within the scope of the following claims.

What is claimed is:

1. An apparatus comprising:
   a support structure including a band having a substantially cylindrical shape, the band having a plurality of motion capture marks each of which is positioned in a respective region of the band that visually contrasts with a corresponding motion capture mark,
   the support structure configured to be affixed to an object whose motion is to be tracked using one or more cameras, and
   the band being of sufficient rigidity such that, in response to movement by the object, each motion capture mark from among the plurality of motion capture marks on the band maintains substantially fixed distances from every other motion capture mark.

2. A motion capture system comprising:
   at least one support structure including a band having a substantially cylindrical shape, the band having a plurality of motion capture marks each of which is positioned in a respective region of the band that visually contrasts with a corresponding motion capture mark, the support structure configured to be affixed to an object whose motion is to be tracked using one or more cameras, and the band being of sufficient rigidity such that, in response to movement by the object, each motion capture mark from among the plurality of motion capture marks on the band maintains substantially fixed distances from every other motion capture mark; and
   a computer system including a machine-readable storage device that stores instructions operable to cause the computer system to perform operations comprising:
      associating a position of the support structure to a position of a corresponding virtual support structure for a virtual skeleton, wherein one or more motion capture marks on the band of the support structure substantially correspond in position to one or more virtual marks on the virtual support structure;

receiving a first frame including one or more camera views of the support structure and selecting from the first frame one or more first motion capture marks on the band of the support structure; and determining a first orientation of the virtual skeleton by substantially aligning one or more of the virtual marks with one or more of the first motion capture marks as constrained by one or more joints and movement possibilities of the virtual skeleton, wherein one or more additional aligned virtual marks serves as an additional constraint for determining the first orientation.

3. The apparatus of claim 1, wherein the plurality of motion capture marks are positioned in alternating regions of the band that alternate between black and white, or between different colors.

4. The apparatus of claim 3, wherein an alternating region of the band has a single mark.

5. The apparatus of claim 1 wherein the motion capture marks comprise one or more shapes.

6. The apparatus of claim 1 wherein the motion capture marks are evenly spaced apart.

7. The apparatus of claim 1 wherein the object is a human and the band of the support structure is configured to be affixed around a torso, an arm or a leg of the human.

8. The apparatus of claim 1 wherein one or more of the motion capture marks has a uniquely identifiable characteristic.

9. The system of claim 2, wherein the plurality of motion capture marks are positioned in alternating regions of the band that alternate between black and white, or between different colors.

10. The system of claim 9, wherein an alternating region of the band has a single motion capture mark.

11. The system of claim 2 wherein the motion capture marks comprise one or more shapes.

12. The system of claim 2 wherein the motion capture marks are evenly spaced apart.

13. The system of claim 2 wherein the object is a human and the band of the support structure is configured to be affixed around a torso, an arm or a leg of the human.

14. The system of claim 2 wherein one or more of the motion capture marks has a uniquely identifiable characteristic.

15. The system of claim 2 wherein the virtual skeleton includes virtual bones connected by the joints, the system further comprising:

a motion model that specifies a range of motion for one or more virtual bones with respect to one or more of the joints, the motion model configured to determine the movement possibilities of the virtual skeleton.

16. The apparatus of claim 1, wherein the support structure is further configured such that when attached to the object, fewer than all of the plurality of motion capture marks on the band are visible within a field of view of any one of the one or more cameras at any given time.

17. The apparatus of claim 1, wherein the support structure is further configured to be attached to the object to substantially prevent translations and rotations relative to the object of the plurality of motion capture marks on the band.

18. The system of claim 2, wherein the operations further comprise determining a three-dimensional position and an orientation of the support structure based on three or more observations of at least one of the plurality of motion capture marks on the band of the support structure, with the observations distributed among the one or more camera views.

19. The system of claim 2, wherein the operations further comprise determining a pose of at least part of the virtual skeleton based on one or more observations of the at least one support structure, with the observations distributed among the one or more camera views.

20. The system of claim 19, wherein one or two observations of the at least one support structure is used for said determining the pose of the at least part of the skeleton.

* * * * *